(No Model.) 4 Sheets—Sheet 1.
C. P. HIGGINS.
MACHINE FOR FORMING HOLLOW FORGINGS.
No. 364,347. Patented June 7, 1887.
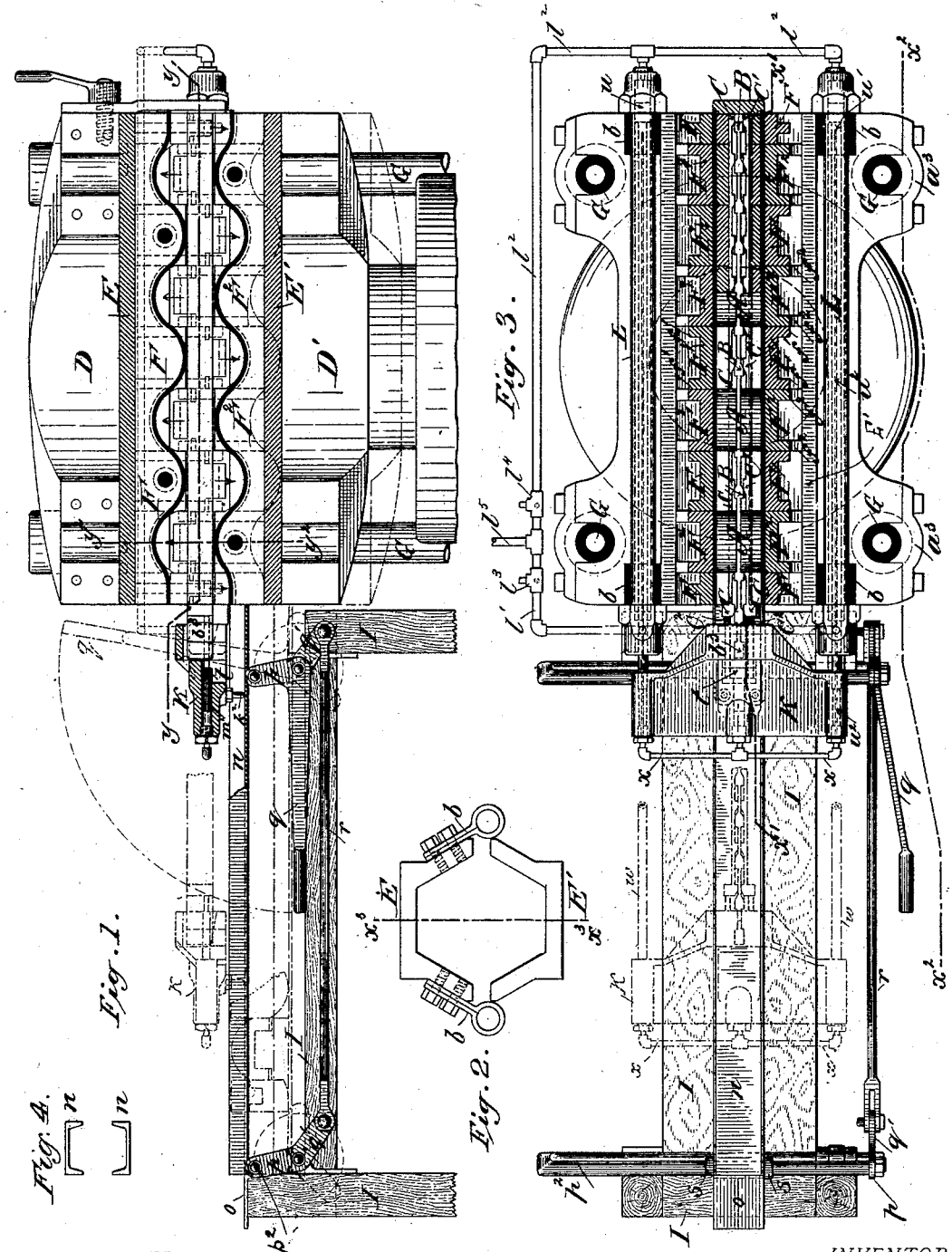
WITNESSES.
A. Creveling
W. W. Weston
INVENTOR.
Campbell P. Higgins
by Chas. W. Forbes
ATTORNEY.

(No Model.) 4 Sheets—Sheet 2.
C. P. HIGGINS.
MACHINE FOR FORMING HOLLOW FORGINGS.
No. 364,347. Patented June 7, 1887.
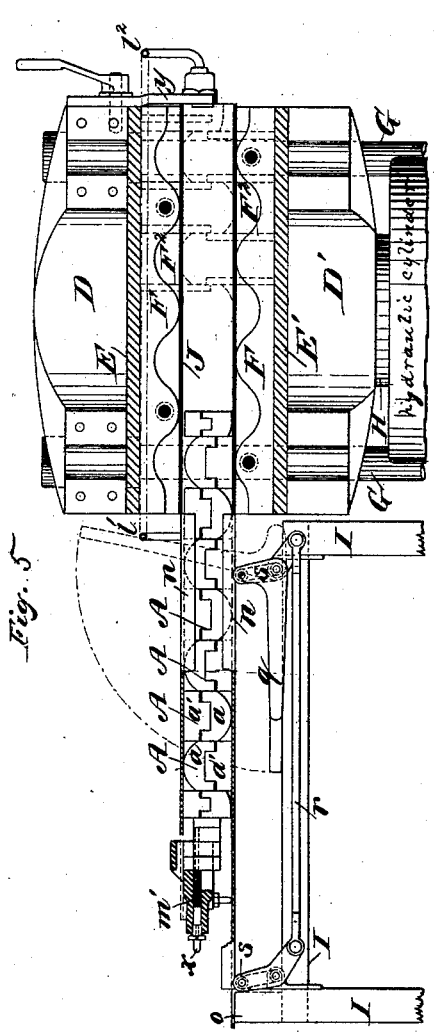
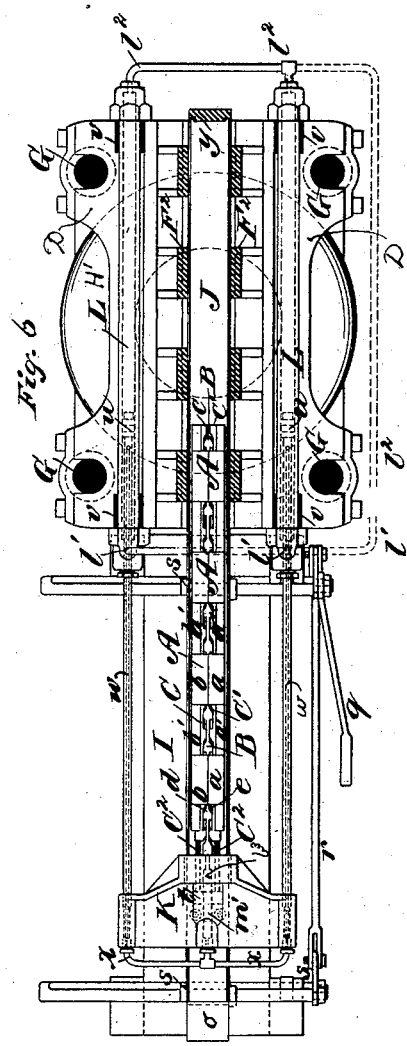

(No Model.) 4 Sheets—Sheet 3.

C. P. HIGGINS.
MACHINE FOR FORMING HOLLOW FORGINGS.

No. 364,347. Patented June 7, 1887.

WITNESSES.

INVENTOR.
Campbell P. Higgins
By Chas. W. Forbes
ATTORNEY.

(No Model.) 4 Sheets—Sheet 4.
C. P. HIGGINS.
MACHINE FOR FORMING HOLLOW FORGINGS.
No. 364,347. Patented June 7, 1887.
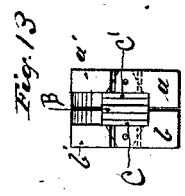
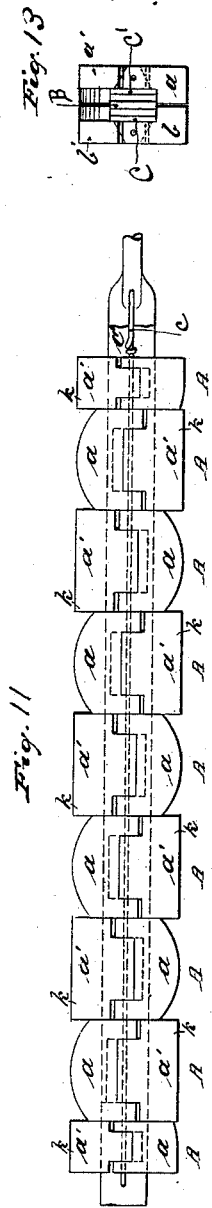
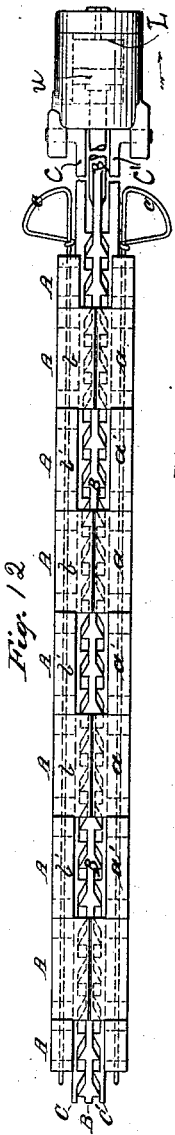
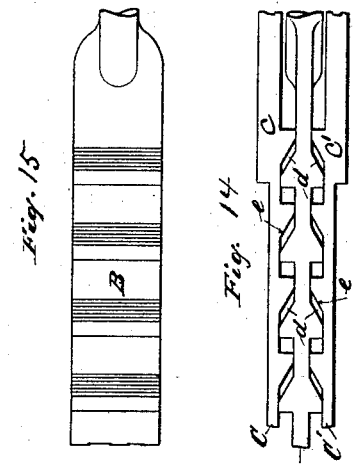
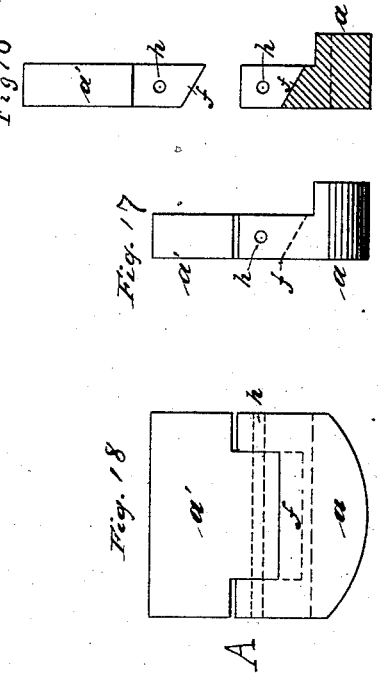
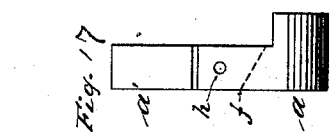
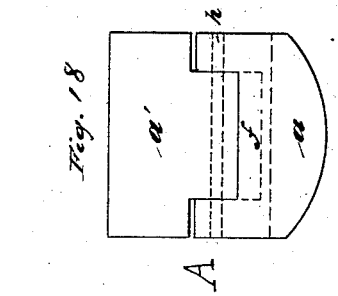
WITNESSES:
Aug Creveling
E. E. Dudley
INVENTOR
Campbell P. Higgins
BY
Charles W. Forbes
ATTORNEY
N. PETERS. Photo-Lithographer, Washington, D. C.

UNITED STATES PATENT OFFICE.

CAMPBELL P. HIGGINS, OF BROOKLYN, NEW YORK.

MACHINE FOR FORMING HOLLOW FORGINGS.

SPECIFICATION forming part of Letters Patent No. 364,347, dated June 7, 1887.

Application filed June 24, 1886. Serial No. 206,103. (No model.)

*To all whom it may concern:*

Be it known that I, CAMPBELL P. HIGGINS, a citizen of the United States, residing at Brooklyn, New York, have invented certain new and useful Improvements in Machines for Forming Hollow Forgings, of which the following is a specification, reference being had to the accompanying drawings, forming a part of the same, and in which similar letters of reference indicate corresponding parts throughout.

In the present instance this invention relates to improvements in machinery for forming corrugated headers of rectangular shape in cross-section for use in sectional steam-boilers; and in order that others may understand and use the same, I will proceed to describe the details of its construction, explain its operation, and subsequently point out in the appended claims its novel characteristics.

Figure 7:
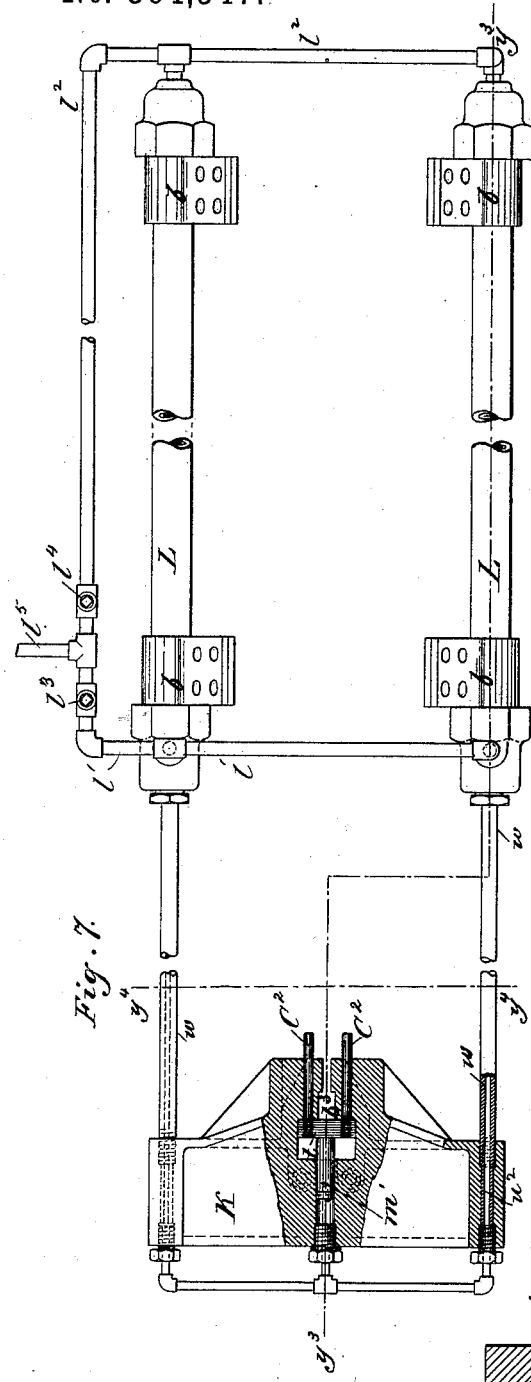
Figure 8:
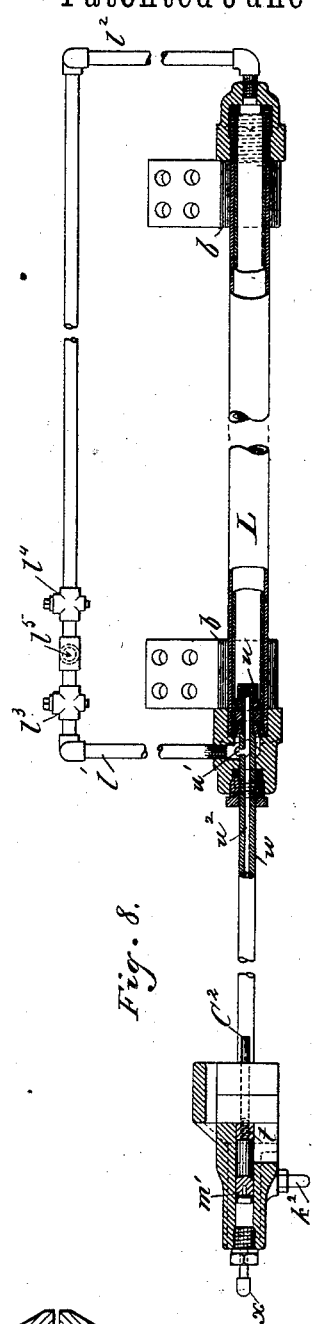
Figure 9:
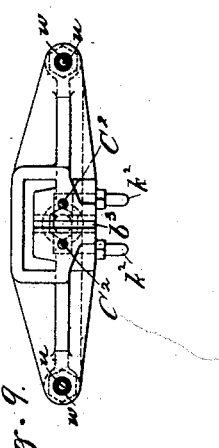
Figure 10:
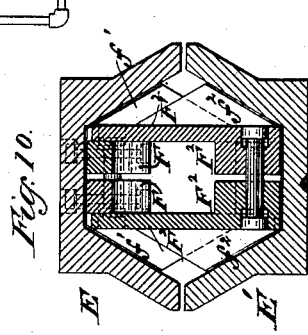

Referring to the drawings, Figure 1 is a longitudinal elevation of a pair of dies and mandrel with operating devices and press, partly in section on the line $x'$ $x'$, Fig. 3, and partly in elevation, with the exception of the removal of the caps $a^3$, as indicated by the line $x^2$ $x^2$ of said Fig. 3. Fig. 2 is a detail end view of the die carriers or troughs. Fig. 3 is a plan view, partly in section on the line $y$ $y$ of Fig. 1. Fig. 4 is an end view of the mandrel-guides $n$ $n$, shown in a relative position corresponding to that in Fig. 5. Fig. 5 is a view of the machine similar to Fig. 1, but showing on a slightly-reduced scale the parts in a different position. Fig. 6 is a plan view, also on a slightly-reduced scale, similar to Fig. 3, but corresponding in the position of the parts to that shown in Fig. 5. Fig. 7 is a detail plan view, enlarged, of parts of the mechanism used for automatically introducing the mandrel between the dies. Fig. 8 is a sectional elevation on the line $y^3$ $y^3$ of Fig. 7. Fig. 9 is a transverse section on the line $y^4$ $y^4$ of Fig. 7. Fig. 10 is a transverse section of the dies and die-carriers on the line $y^2$ $y^2$, Fig. 1. Fig. 11 is an enlarged side elevation of the mandrel itself. Fig. 12 is a plan view and Fig. 13 an end view of Fig. 11. Figs. 14 and 15 are enlarged plan and side views, respectively, of the mandrel-spreading device; and Figs. 16, 17, and 18 are enlarged end and side views in detail of the several parts composing each mandrel-block.

D D', Figs. 1 and 5, are the stationary and movable heads, respectively, of a hydraulic press, having attached to their faces the troughs or die-carriers E E', Figs. 2 and 10, which appear in Fig. 1 in longitudinal section on the line $x^3$ $x^3$ of Fig. 2, and in which serpentine-faced dies F F² are supported. The movable head D', having a hydraulic plunger, H, is guided in its vertical movement toward and from the stationary head D by the supporting-frame rods G.

The serpentine-faced dies F F² have a peculiar construction, which I have fully set forth in another application filed simultaneously herewith; but for purposes of clearness it may be here mentioned that each of the dies F F² are subdivided into equal halves or pairs, being vertically divided by a longitudinal central division, as will be observed in Fig. 10, and also by the absence of section-lines on the said dies in Figs. 1 and 5, in which, although the machine is shown in central section, the dies appear in elevation at their central plane of division. The upper dies, F, have each at their outer sides a series of downwardly-projecting wings, which mesh with corresponding alternate upwardly-projecting wings on the dies F². These series of alternate wings appear in horizontal section throughout in Fig. 3, while the wings of the lower dies, F², only are similarly shown in Fig. 6. The wings of the lower dies, F², appear in vertical transverse section in Fig. 10. When interlocked, these wings form continuous interior flat vertical sides to the dies, which support and compress the exterior of each of the vertical sides of the blank during the act of corrugation. Furthermore, the compression of the wings inwardly toward the blank is effected by the means of series of oblique ribs $f'$ $f^2$, Figs. 3 and 10, projecting from the backs of said wings, which engage with the interior converging sides of the troughs E E' and effect their transverse horizontal movement toward one another by impact of the oblique wings against the said troughs during the vertical compression of the latter.

The sectional mandrel, which rests on a suitable frame, I, when out of the work, and which is fully shown in detail in Figs. 11 to 18, inclusive, is composed of a series of blocks, A A, which are shown contracted in Figs. 11, 12, 13, and also in Fig. 5 ready for insertion within the blank J to be corrugated, and are shown sinuously expanded after the act of compression of the dies in Fig. 1.

The blocks A are rounded on their working-faces to correspond with the curvature of the depressions in the serpentine-faced dies F F², and are capable of simultaneous movement in alternate opposite directions in a vertical plane common to the plane of the movement of the said dies, which movement is caused by the compression of said dies, the said movement being in the direction of the rounded faces of the blocks, as indicated by the arrows shown on each block in Figs. 1, 5, and 11.

Each of the blocks A is composed of four separate parts, $a$ $a'$ and $b$ $b'$, to facilitate their removal after the blank has been corrugated. The inclined adjacent faces $f$ of the constituent parts $a$ $a'$ and $b$ $b'$ of the blocks A (shown clearly in Figs. 16, 17, and 18) are designed to impart an expanding tendency to the parts $a$ and $b$, Fig. 13, by impact of said faces when pressure is applied to the blocks A.

The separate pieces comprising the mandrel blocks or sections are assembled upon each side of a spreading device or expanding-core, and there held together temporarily by means of the rods $c$, Fig. 11, passing through holes $h$, Figs. 16, 17, 18, throughout the several sections, said rods being removed after the mandrel is placed in position within the blank. However, in case the mandrel is to be introduced between the dies by means of the mechanism shown in Figs. 1 to 9, inclusive, the rods $c$ are dispensed with, and the sections are preferably held together temporarily by means of the supporting-mandrel guides $n$ $n$, Fig. 4, the lower one of which appears partly in section in Fig. 1, and both of which appear partly in elevation in Fig. 5. The lower guide also appears in plan view in Fig. 3.

The expanding-core of the mandrel is composed of three parallel parts, two of which, C C', are arranged on opposite sides of the third, B, Figs. 12 and 14, which is made capable of a longitudinal movement between C and C', and is moved by means of a piston, $u$, within a pressure-cylinder, L, Fig. 12, or by the means illustrated in Figs. 1 to 9, inclusive, in which the duplicate pistons $u$ of a pair of cylinders, L, perform like functions, being connected to the opposite end of the said part B by means of the connecting piston-rods $w$ and a cross-head, K.

Upon the sides of the part B, Fig. 14, are a series of cams or wedges, $d$, which engage with the inclined faces $e$ in the depressions of the adjacent parts C C', for the purpose of expanding the core by the longitudinal movement of the part B.

The devices employed to facilitate the insertion and withdrawal of the sectional mandrel through the blank pipe J (illustrated in Figs. 1 to 9, inclusive) are made automatic in their action by the following construction: The central part, B, of the mandrel-expanding core, Fig. 3, is coupled to a cross-head, K, by a suitable "T-head" fitting in the vertical slot $b^3$, Fig. 7, and the adjacent parts C C' of said mandrel-core abut against the projecting rods C² of the small piston or plunger $m'$, said rods being connected to the plunger by the cross-piece $t$. (Shown in Fig. 7, and also by dotted lines in Figs. 3 and 6 and in section in Figs. 1, 5, and 8.)

The cross-head K is capable of longitudinal travel by means of the pistons $u$ in the pair of cylinders L. (Shown enlarged in Figs. 7, 8, and 9.) The cylinders L are secured in place by means of the straps $b$, bolted to the sides of the die-carrier E, Fig. 2, of the stationary press-head D.

The pistons $u$ have hollow rods $w$, through which water is forced from the chamber of the cylinders L in the front or piston-rod side of said pistons, through the openings $u'$ and channels $u^2$ in the piston-rods, to the pipes $x$, for the purpose of operating the plunger $m'$ simultaneously with the movement of said pistons $u$ during the insertion of the mandrel.

The mandrel is guided during its insertion by the portable guideways $n$, between which it is assembled, the said guideways being lowered from the position shown in the drawings by means of the levers $p$, when the cross-head has been run out so as to rest with its studs $k^2$ upon the plate $o$ of the frame I. During this lowering movement the T-coupling of the part B in the slot $b^3$ of the cross-head K descends out of its socket.

The lifting-arms $p$, bolted to the ends of the transverse rocking bars $p^2$, are operated by the hand-lever $q$, levers $q'$, and connecting-rod $r$, the upper sides of said rocking bars $p$ reciprocating under the lower guide-frame, $n$, which latter is capable of vertical movement, and may be lowered to the position shown by dotted lines in Fig. 1 when the lever $q$ is raised. The guide-frame $n$ is retained transversely in its position upon the rocking bars $p^2$ by means of suitable shoulders, $s$. The bars may be provided at this part with friction-rollers for the purpose of bearing the frame $n$ with a reduction of friction.

The operation of my invention is as follows: The mandrel being assembled between the lower guide-trough $n$ and the upper trough $n$, which hold the blocks in position, the blank of straight pipe of square—or, in the present instance, rectangular—cross-section, is inserted at welding-heat between the dies F F while the mandrel is in its lowered position, the said mandrel within its guides $n$ $n$ now being raised by the hand-lever $q$ into line with the blank. This movement brings the core B C C' of said mandrel into operative connection with the cross-head K, the T-head of the part B entering the slot $b^3$. Water is now admitted to the cylinders L from the water-pressure-supply pipe $l^5$ through the cock $l^3$ and pipes $l'$, passing also into the openings $u'$ of the piston-rods $w$, and through the connections $x$ into the cavity or cylinder of the plunger $m'$ in the center of the cross-head K. The pressure thus applied holds the movable parts C C' of the mandrel in advance of the center part, B, during its travel into the work until the opposite ends of said parts C C' of the mandrel strike a stop, $y$, terminating their movement, together with that of the mandrel-blocks. The arrest of the parts C C' and plunger $m'$ is followed by the continued movement of the cross-head K and center part, B, of the mandrel-core, owing to excess of pressure on the larger pistons $u$, which, setting out the inclines $e$ on the inclines $d$, expand the core, forcing out the sides of the mandrel firmly against the inside of the blank, compressing the vertical sides of said blank between the mandrel and the interlocking sides of the dies F F', Fig. 3, during the corrugating operation. The dies are now advanced upon the exterior of the blank, the projecting portions of the working-faces thereof transmitting compression through the metal of the blank at points opposite the backs $k$ of the corresponding adjacent blocks, A, which force the opposite sides of the blank into the opposite corresponding depressions in the dies and impart the corrugated form to the header. The process being completed, the dies F F² are now retired, and water is admitted from the supply-pipe $l^5$ through the cock $l^4$ and pipes $l^2$ of the cylinders $l$, applying the pressure on the opposite sides of the pistons $u$, the cock $l^3$ being closed and the water first admitted allowed to escape through cocks provided therefor during the reversal. The center part, B, of the mandrel-core, which carries with it the parts C C', is now withdrawn by the outward movement of the cross-head K, and the several parts of the sectional blocks A are thereby released, to be afterward dropped out of the corrugated header in pieces and reassembled for subsequent repetition of the operation.

Having thus fully described my invention, what I claim, and desire to secure by Letters Patent, is—

1. In a machine for making hollow hydraulic forgings, a movable mandrel-support placed outside of the working-dies and below the level of the same, in combination with means for raising said support to the level of the dies and for feeding said mandrel into the press.

2. In a machine for forming hollow hydraulic forgings, a movable mandrel-support placed outside of the working-dies and below the level of the same, in combination with means for raising said support to the level of the dies and for feeding the assembled mandrel into the press, to match the position of the exterior dies and to effect a further continued movement of the core of the mandrel in the same direction to expand said mandrel laterally.

3. In a machine for making hollow hydraulic forgings, a mandrel-support consisting of top and bottom troughs of U-shaped section, to retain the sections forming the mandrel in proper position while being built up and fed into the press.

CAMPBELL P. HIGGINS.

Witnesses:
 C. W. FORBES,
 AUG. CREVELING.